United States Patent
Loubet et al.

(10) Patent No.: US 9,733,074 B2
(45) Date of Patent: Aug. 15, 2017

(54) METHOD OF ANALYZING THE CHANGES IN GEOMETRY OF AN IRRADIATED FUEL

(71) Applicant: COMMISSARIAT A L'ENERGIE ATOMIQUE ET AUX ENERGIES ALTERNATIVES, Paris (FR)

(72) Inventors: Laurent Loubet, Villelaure (FR); Brigitte Lacroix, La Tour D'Aigues (FR); Jean Noirot, Aix en Provence (FR); Thierry Martella, Meyrargues (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 230 days.

(21) Appl. No.: 14/452,300

(22) Filed: Aug. 5, 2014

(65) Prior Publication Data

US 2015/0041670 A1 Feb. 12, 2015

(30) Foreign Application Priority Data

Aug. 7, 2013 (FR) ..................................... 13 57868

(51) Int. Cl.
G01B 15/06 (2006.01)
G01T 1/36 (2006.01)
G21C 17/06 (2006.01)

(52) U.S. Cl.
CPC .............. *G01B 15/06* (2013.01); *G01T 1/36* (2013.01); *G21C 17/06* (2013.01)

(58) Field of Classification Search
CPC ............ G01B 15/06; G21C 17/06; G01T 1/36
See application file for complete search history.

(56) References Cited

U.S. PATENT DOCUMENTS 4,229,654 A * 10/1980 Arya .................... G21C 17/063
  250/358.1
2006/0056566 A1* 3/2006 Vandergheynst ...... G21C 17/06
  376/245

(Continued)

FOREIGN PATENT DOCUMENTS

JP 2012185108 A 9/2012

OTHER PUBLICATIONS

Ducros et al. "Use of gamma spectrometry for measuring fission product releases during a simulated PWR severe accident: Application to the VERDON experimental program", 2009, 7 pages. DOI: 10.1109/ANIMMA.2009.5503821.*

(Continued)

*Primary Examiner* — David Porta
*Assistant Examiner* — Mindy Vu
(74) *Attorney, Agent, or Firm* — Baker Hostetler LLP

(57) ABSTRACT

A method for analysing at least one fuel rod comprising a stack of nuclear fuel, a rod comprising packed zones completely filled with fuel and intermediate zones partially full of fuel, comprises: acquiring a count profile associated with a non-migrating isotope, a profile being made up of spectrometry measurements taken along the rod for this isotope; determining a set of at least one indicator K_i that makes it possible to quantify the reduction in material at an intermediate zone of index i, the said indicator being deduced from the count profile; detecting the change in geometry by comparing the set of at least one indicator K_i against a set of at least one reference value RK indicative of the initial geometry of the nuclear fuel stack.

10 Claims, 2 Drawing Sheets

(56) References Cited

U.S. PATENT DOCUMENTS

2006/0227922 A1* 10/2006 Pop .................... G01N 1/04
376/308
2010/0284504 A1* 11/2010 Le Tourneur .......... G21C 17/06
376/257

OTHER PUBLICATIONS

K. Abbas, et al., "In Situ Gamma Spectroscopy of Spent Nuclear Fuel Using a CdTe Detector", Nuclear Instruments and Methods in Physics Research A: Accelerators, Spectrometers, Detectors, and Associated Equipment, Dec. 11, 1996, pp. 301-604, vol. 383, No. 2, Elsevier BV, North-Holland, NL, XP04016226.

I. Matsson, et al., "Developments in Gamma Scanning of Irradiated Nuclear Fuel", Applied Radiation and Isotopes, Oct. 12, 1997, pp. 1289-1298, vol. 48, No. 10-12, Elsevier Science Ltd., Oxford, GB, XP004101713.

J. Lamontagne, et al., "Swelling Under Irradiation of MgO pellets containing americium oxide: The ECRIX-H Irradiation Experiment", Journal of Nuclear Materials, Apr. 12, 2011, pp. 137-144, vol. 413, No. 3, Elsevier BV, NL, XP028222134.

* cited by examiner

METHOD OF ANALYZING THE CHANGES IN GEOMETRY OF AN IRRADIATED FUEL

CROSS-REFERENCE TO RELATED APPLICATION

This application claims priority to foreign French patent application No. FR 1357868, filed on Aug. 7, 2013, the disclosure of which is incorporated by reference in its entirety.

FIELD OF THE INVENTION

The invention relates to a method for analysing the changes in geometry of an irradiated fuel and applies to the field of the analysis of radioactive fuel, more particularly the analysis thereof using gamma-ray spectrometry.

BACKGROUND

The fuel used in nuclear power stations changes over time as it is used. It is commonplace for this change to be analysed and, in order to do so, fuel elements are removed then evaluated in laboratories equipped with enclosures suited to reducing exposure to radiation, for example using thick lead walls. These enclosures are referred to as high-activity cells or hot cells.

The fuel analysed usually takes the form of an irradiated fuel rod. Tools and methods have been developed over the years for studying these.

The evaluations carried out in the hot cells may be destructive, physical intervention of the rod then being required. By way of example, the fuel may therefore be cut into sections for this type of evaluation.

Alternatively, evaluations known as non-destructive evaluations and denoted by the abbreviation NDE may also be carried out. In that case, the geometry of the rod remains unaltered. Non-destructive evaluations can be carried out by measuring the radiation emitted by the isotopes resulting from the fission of a fuel such as uranium-235, denoted U-235 throughout the rest of the description. By way of example, gamma-ray spectrometry, the principle of which is to identify radioactive elements by measuring the energy of the gamma radiation (photons) emitted, provides damage-free access to information directly connected with the fuel contained in the rod.

With knowledge of the gamma spectral lines of the isotopes that are to be studied it is possible to take measurements by region of interest in order to obtain a surface area in measurement steps and by isotope. The distribution of the fission products created by the irradiation and visible in gamma-ray spectrometry provides direct access to the features of the fuel stack, such as the start of the stack and the end of the stack and provides information regarding the irradiation. In this description, the expression "fuel stack" denotes a collection of at least two pellets which are aligned and placed one behind the other. A rod is an assembly made up of a fuel stack, of a cladding comprising the said stack and of two end plugs, one at each end of the cladding.

Rods for pressurised water reactors, referred to as PWR rods, are made up of a cylindrical cladding containing a plurality of fuel pellets positioned one after another longitudinally inside the said cladding. The pellets are of cylindrical shape and have a length of the order of one centimetre. At their ends they have chamfers and cavities (more usually denoted by the English word "dishing"), one of the purposes of this being to allow them to absorb deformation.

The special geometry of the pellets leads to reductions in material at their ends. The result of this is that the gamma count rates for the fission products around these zones are lower. This variation in the count rate thus makes it possible to distinguish the pellets from one another.

Multi-channel analysers are usually employed for analysing the gamma spectrum. These analysers as output data deliver histograms made up of several channels. One histogram channel j corresponds for example to one energy band $B_j$. The quantities to be measured pertaining to the gamma photons are classified by channel according to their energy level. The set of channels j indicative of a spectrum make up a histogram.

The quantity measured for a channel j corresponds to a number of events measured in a given time, also known as counts. For each channel, the counts measured are counted up, making it possible to determine the value associated with the said channels. The counts correspond to measurements indicative of interactions between the particles that are to be measured and the sensor used, for example the germanium crystal. In other words, when a particle is detected by the sensor, a count is counted. The histogram is usually represented with the energy level along the abscissa axis and the number of counts on the ordinate axis (in which case it gives a "count") or as a number of counts per second (which then gives a count rate).

Non-destructive examination NDE of irradiated fuel rods using gamma-ray spectrometry notably makes it possible to locate the zones separating two adjacent pellets, these zones being referred to in the remainder of the description as inter-pellet zones.

There is a need to know about the change in geometry of the fuel stacks and pellets of which they are made during their cycle in the reactor notably in order to further the understanding of the phenomena that occur in a reactor. The objective of gaining this knowledge is notably to improve the methods of manufacture of these fuels, pellets and rods, to better control the reactor or even manage accidents.

One of the objects of the invention is to address these insufficiencies of the prior art and make improvements thereto.

SUMMARY OF THE INVENTION

To this end, one subject of the invention is a method for analysing at least one fuel rod comprising a stack of nuclear fuel, a rod comprising packed zones completely filled with fuel and intermediate zones partially full of fuel, the method comprising the following steps:
  acquiring a count profile associated with a non-migrating isotope, a profile being made up of spectrometry measurements taken along the rod for this isotope;
  determining a set of at least one indicator K_i that makes it possible to quantify the reduction in material at an intermediate zone of index i, the said indicator being deduced from the count profile;
  detecting the change in geometry by comparing the set of at least one indicator K_i against a set of at least one reference value RK indicative of the initial geometry of the nuclear fuel stack.

In one embodiment, the analysis method comprises a step of estimating the location of the intermediate zones by analysing the count profile.

The change in geometry is for example detected in the detection step for at least one intermediate zone and deduced by statistical analysis of the indicators of K_i, a change in geometry being flagged when at least one value K_i is incompatible with a theoretical measurement spread that could be expected with no change in geometry.

The change in geometry is for example detected for at least one intermediate zone by comparing K_i with a predefined reference value RK, a change in geometry being detected when the ratio between K_i and RK exceeds a previously-chosen comparison threshold k1 or lies below another previously chosen comparison threshold k2.

The reference value RK is for example determined statistically as the mean of the K_i values observed experimentally over a plurality of rods of the same type.

Alternatively, the reference value RK is for example determined by theoretical calculation for a given pellet geometry.

The rod corresponds for example to a rod or a section of rod of PWR type made up of a plurality of pellets, an intermediate zone corresponding to an inter-pellet zone.

A non-migrating isotope of Ru-136 type may be used to determine the count profile.

Another subject of the invention is a system for analysing at least one nuclear fuel rod comprising a gamma-ray spectrometry device and a processing unit implementing the method described hereinabove.

Another subject of the invention is a computer program containing instructions for executing the method described hereinabove, when the program is executed by a processor.

BRIEF DESCRIPTION OF THE DRAWINGS

Other features and advantages of the invention will become apparent through the description which follows by way of nonlimiting illustration, given with reference to the attached drawings among which.

DETAILED DESCRIPTION

Figure 1:
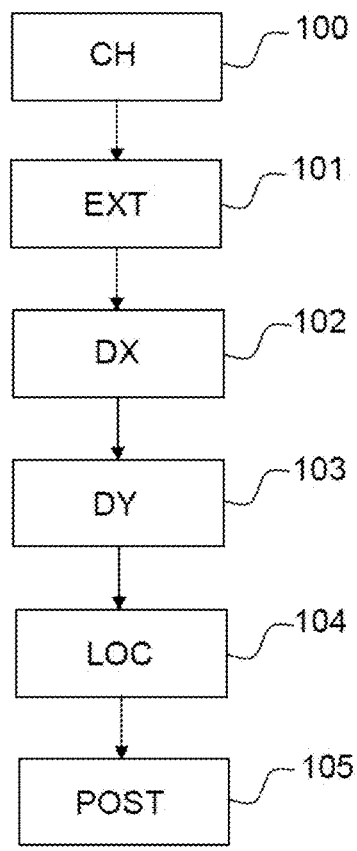
FIG. 1 gives an example of a method that allows inter-pellet zones in a rod to be located.

FIG. 1 gives a simplified example of a method that allows the inter-pellet zones to be located in a PWR rod or rod section.

The measurements acquired by gamma-ray spectrometry allow a full spectrum to be obtained for each measurement step. The rod studied can be moved transversely to the measurement device used, so that the said device can measure the entire fuel stack. The reverse is also possible. It is then the device that moves. This device uses a measurement window with a size usually of the order of one millimeter through which the gamma radiation of the photons is measured. For each measurement point, the clearly defined surfaces per region of interest are calculated for example for around fifteen isotopes, as is the total count for all energies. That makes it possible to plot the distributions of count rates by isotope. It is also possible to plot the distribution of the total count along a fuel stack. These distributions are referred to in the remainder of the description as "count profiles".

A succession of steps can then be carried out in order to locate the inter-pellet zones. That notably makes it possible to count and study the change in shape of the pellets during combustion (i.e. during their cycle in the reactor).

A first step 100 selects a count profile associated with a given isotope. This profile needs to be exploitable, i.e. needs to correspond to a distribution that displays good characteristics in statistical terms.

A second step 101 is aimed at eliminating the end zone of the stack that is being processed.

A third step 102 corresponds to the selection of an axial range DX aligned with the fuel cell and expressed in millimeters. A rolling mean of the count rates is calculated over this axial range. By way of example, DX=5 mm.

A fourth step 103 corresponds to the selection of a detection threshold DY. This threshold allows the pellet zones to be discriminated. If the count at a point x differs from the rolling mean calculated for this point by more than DY percent then the point is considered to belong to an inter-pellet zone. By way of example, DY=5%.

A fifth step 104 acquires the location of the pellets found, i.e. the start distance and end distance for each of them.

A sixth step 105 can be run as an option in order to manually join together two zones which would not have been considered to belong to the same pellet even though the lengths of the fragments situated on each side of an inter-pellet zone are significantly shorter or longer than the expected length (and vice versa).

Figure 2:
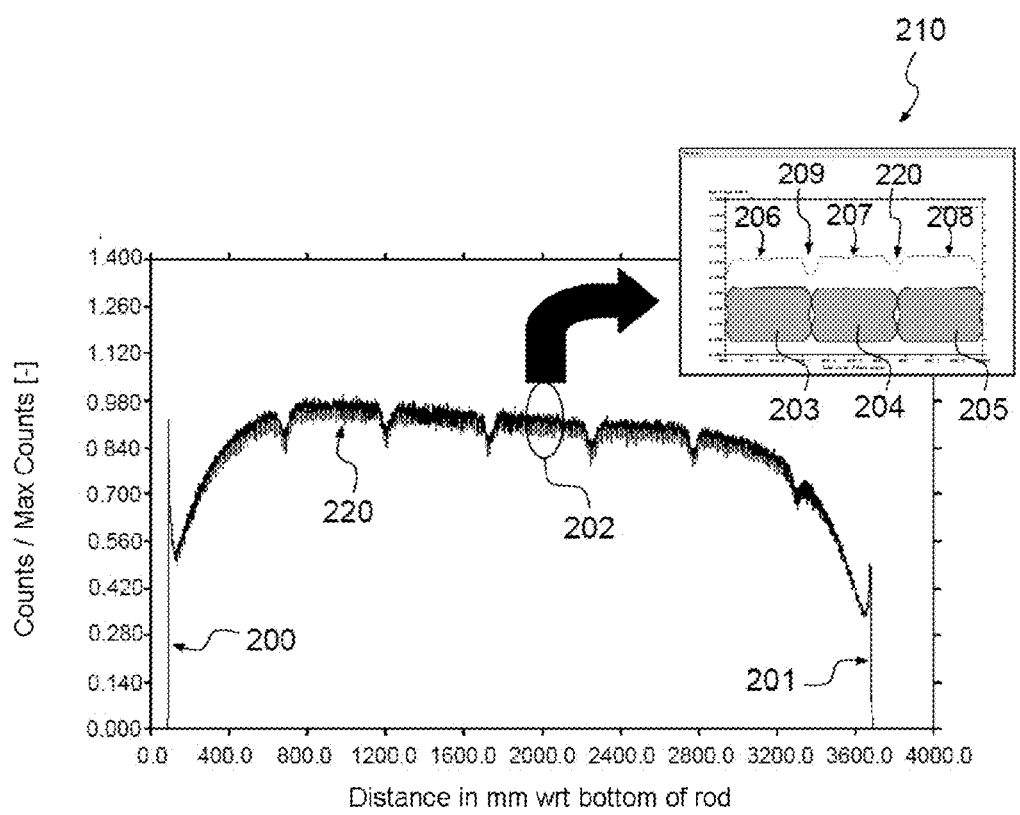
FIG. 2 depicts a Cs-137 count curve measured by gamma-ray spectrometry on a fuel stack made up of a plurality of pellets.

FIG. 2 depicts a Cs-137 count curve measured by gamma-ray spectrometry on a fuel stack made up of a plurality of PWR pellets. The abscissa axis indicates the distance in millimeters, i.e. the location of the various measurement points. The normalised number of counts (counts over max counts) measured is given on the ordinate axis.

As mentioned previously, observing the radiation of a fission product using gamma-ray spectrometry provides direct access to the features of the fuel stack. In this example, the radiation of Cs-137 has been observed, this observation making it possible to locate the start of the stack 200 and the end of the stack 201. Furthermore, in this example, the particular geometry of the pellets contained in PWR rods leads to reductions in material at their ends. Thus, the gamma count rate for the fission products is lower at the inter-pellet zones making it possible to distinguish the position of the pellets relative to one another. A region 202 of the measured curve has been enlarged 210. This region corresponds to a length of three pellets 203, 204, 205. The measured count rate curve shows three plateaus 206, 207, 208 corresponding to the packed pellets parts. Moreover, two dips 209, 220 appear and correspond to the inter-pellet zones. It is thus possible, by analysing the curve obtained, to study the geometry of the fuel stack and, where appropriate, the geometry of the pellets of which it is composed. It is then possible to count the pellets, check the manufacture of the rods and monitor the elongation of the rod following irradiation thereof. The method set out in FIG. 1 can be used for that.

Figure 3:
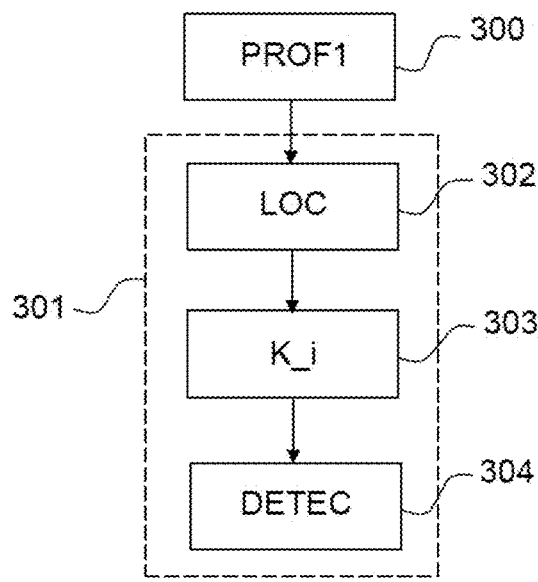
FIG. 3 illustrates in a simplified manner a method of analysing the changes in geometry of an irradiated fuel.

FIG. 3 illustrates in a simplified manner a method of analysing the changes in geometry of an irradiated fuel.

A first step 300 at a first instant takes gamma spectrum measurements along a fuel rod or a fuel stack comprising several pellets with a measurement step chosen beforehand. The result of these measurements corresponds to a collection of gamma spectra, one spectrum being obtained for each measurement step. A first measurement profile also referred to as a count profile is extracted from the gamma spectra. This count profile is determined for a non-migrating isotope.

A non-migrating isotope is an isotope that remains where it was produced at the time of fission, regardless of the temperature at which the fuel has been exposed. Ruthenium- 106 (Ru-106) can be used as a non-migrating isotope but other non-migrating isotopes may also be used for that, such as Zr-95, Eu-154 or Rh-103.

A set of steps 301 is then carried out in order to determine whether there has been a change in geometry of the fuel stack.

A step 302 is carried out in order to locate the intermediate zones and thus differentiate them from the packed zones. A zone of a rod is said to be packed when it is completely full of material and an intermediate zone is a zone of a rod that is not completely packed with material. An intermediate zone therefore corresponds to an inter-pellet zone or alternatively to a zone corresponding to the end of a fuel rod.

In the remainder of the description, it is inter-pellet zones that are of interest but the invention may be applied to other intermediate zones.

By way of example, an intermediate zone between two pellets of a PWR rod contains of the order of ten percent less material than a packed zone corresponding to an RK value of 0.90. Such a zone is also referred to as an inter-pellet zone. In the remainder of the description, it is inter-pellet zones that are of interest but the invention may be applied to other intermediate zones such as the zones found at each end of the rod.

In order to locate the intermediate zones precisely, use may be made of a count profile for the non-migrating isotope which is determined for the rod at a reference measurement time. Analysing the non-migrating isotope radiation measurements makes it possible to obtain a reference value that is indicative of the difference in emission of gamma radiation between a packed zone and an intermediate zone. In one embodiment, the method described hereinabove with the aid of FIG. 1 can be used to perform such an analysis.

Alternatively, the intermediate zones may be located by using a drawing that gives the geometry of a stack prior to combustion.

A step 303 has the objective of determining an indicator $K\_i$ that makes it possible to quantify the reduction in material at the intermediate zones located in the previous step 302. This indicator corresponds to a comparison between an interpolated value $T\_i$ for this zone and the value from the measurement profile for the non-migrating isotope in the intermediate zone.

The interpolated value $T\_i$ corresponds to a value that could have been measured on the intermediate zone had the latter been packed with material. For the next steps, it is possible to use the set of $K\_i$ values determined for each inter-pellet zone of index i or a subset of at least one of these values.

Next, a step 304 has the purpose of detecting a change in geometry in the rod. A reference value RK can be determined for that.

The reference value RK can be determined statistically by the mean of the $K\_i$ values observed experimentally across a plurality of rods of the same type.

Alternatively, the reference value RK can be determined by theoretically calculating a given geometry of pellet, which is recalibrated to the configuration and type of measurement equipment used for performing the gamma-ray spectrometry.

The value of RK is, for example, 0.9.

In all cases, a deviation between $K\_i$ and this determined value RK is then the sign of a change in geometry.

In one exemplary embodiment, constants k1 and k2 in which k1<k2 can be used to detect the change of geometry, this being done as follows.

If $k1 \times RK \leq K\_i \leq k2 \times RK$, with, for example, k1=0.95 and k2=1.05, then there is no significant change in geometry.

If $K\_i21\ k1 \times RK$ or if $K\_i > k2$ then a change in geometry is detected.

In this example, a check is thus carried out to ensure that the value of $K\_i$ is comprised between 85% and 90% of the reference value RK.

If such is not the case, a change in geometry is detected at the inter-pellet zone of index i.

Still in this example, if $K\_i$ is greater than 105% of the reference value RK then there is a change in geometry by filling or even swelling. If, by contrast, $K\_i$ is less than 95% of the reference value RK, there is a change in geometry by excessive dishing of the inter-pellet zone considered.

More generally, comparing $K\_i$ with RK therefore makes it possible to detect a change in geometry corresponding to a swelling, a filling or excessive dishing.

A person skilled in the art can choose to use other indicators that allow the values of $K\_i$ to be compared against a reference value.

This comparison also where appropriate makes it possible to detect and quantify deformations of the fuel caused for example by the swelling of a pellet or the filling of an inter-pellet zone, or even the excessive dishing thereof.

The invention claimed is:

1. A method for analyzing at least one fuel rod comprising a stack of nuclear fuel, a rod comprising packed zones completely filled with fuel and intermediate zones partially full of fuel, the method being implemented by an analysis system comprising a gamma ray spectrometry device having a sensor and a spectrometry processing unit, the method comprising the following steps:

measuring gamma ray radiation emitted by the nuclear fuel with the sensor of the gamma ray spectrometry device to acquire spectrometry measurements of said at least one fuel rod;

acquiring a count profile with the spectrometry processing unit associated with a non-migrating isotope in said at least one fuel rod, a count profile being derived from the spectrometry measurements taken along the at least one rod for said non-migrating isotope with the sensor of the gamma ray spectrometry device;

determining with the spectrometry processing unit a set of at least one indicator $K\_i$ to quantify a reduction in material at an intermediate zone of index i, the said indicator being deduced from the count profile; and detecting a change in geometry of said at least one fuel rod with the spectrometry processing unit by comparing the set of at least one indicator $K\_i$ against a set of at least one reference value RK indicative of the initial geometry of the nuclear fuel stack.

2. The analysis method according to claim 1, comprising a step of estimating the location of the intermediate zones by analyzing the count profile with the spectrometry processing unit.

3. The analysis method according to claim 1, in which the detecting the change in geometry is detected in at least one intermediate zone and deduced by statistical analysis of the indicators of $K\_i$, a change in geometry being flagged when at least one value $K\_i$ is incompatible with a theoretical measurement spread that could be expected with no change in geometry.

4. The analysis method according to claim 1, in which the detecting the change in geometry is detected for at least one intermediate zone by comparing $K\_i$ with a predefined reference value RK, a change in geometry being detected when the ratio between $K\_i$ and RK exceeds a previously-chosen comparison threshold k1 or lies below another previously chosen comparison threshold k2.

5. The method according to claim 4, in which the reference value RK is determined statistically by the mean of the K_i values observed experimentally over a plurality of rods of the same type.

6. The method according to claim 4, in which the reference value RK is determined by theoretical calculation for a given pellet geometry.

7. The method according to claim 1, in which the rod is a rod or a section of rod of PWR type made up of a plurality of pellets, an intermediate zone corresponding to an inter-pellet zone.

8. The method according to claim 1, in which a non-migrating isotope of Ru-136 type is used to determine the count profile.

9. A system for analyzing at least one nuclear fuel rod comprising the gamma-ray spectrometry device and the spectrometry processing unit implementing the method according to claim 1.

10. A computer program stored on a non-transitory computer readable storage medium containing instructions for executing the method according to claim 1 when the program is executed by a processor of the analysis system.

* * * * *